(12) United States Patent
Neale et al.

(10) Patent No.: US 6,688,666 B2
(45) Date of Patent: Feb. 10, 2004

(54) SECOND ROW FOLD AND PIVOT SEAT ASSEMBLY

(76) Inventors: Colin G. Neale, 39473 Village Run Dr., Northville, MI (US) 48167; Carl J. Holdampf, 35572 Johnstown Rd., Farmington Hills, MI (US) 48335

( * ) Notice: Subject to any disclaimer, the term of this patent is extended or adjusted under 35 U.S.C. 154(b) by 0 days.

(21) Appl. No.: 10/243,506

(22) Filed: Sep. 13, 2002

(65) Prior Publication Data

US 2003/0075946 A1 Apr. 24, 2003

Related U.S. Application Data

(60) Provisional application No. 60/322,150, filed on Sep. 13, 2001.

(51) Int. Cl.$^7$ ................................................. B60N 2/14
(52) U.S. Cl. ......................... 296/65.09; 296/65.16; 297/336
(58) Field of Search ..................... 296/65.01, 65.05, 296/65.09, 65.16; 297/335, 336

(56) References Cited

U.S. PATENT DOCUMENTS

| | | | |
|---|---|---|---|
| 4,408,798 A | * | 10/1983 | Mizushima et al. |
| 4,695,094 A | | 9/1987 | Siebler |
| 5,393,116 A | | 2/1995 | Bolsworth et al. |
| 5,482,345 A | * | 1/1996 | Bolsworth et al. ............ 297/336 |
| 5,498,051 A | | 3/1996 | Sponsler et al. |
| 5,593,208 A | | 1/1997 | Mitschelen et al. |
| 5,626,391 A | | 5/1997 | Miller et al. |
| 5,662,368 A | | 9/1997 | Ito et al. |
| 5,765,894 A | * | 6/1998 | Okazaki et al. ............. 297/336 |
| 5,810,443 A | * | 9/1998 | Blanchard .................... 297/336 |
| 5,871,255 A | * | 2/1999 | Harland et al. .............. 297/336 |
| 5,927,808 A | * | 7/1999 | Esker .......................... 297/335 |
| 6,000,742 A | | 12/1999 | Schaefer et al. |
| 6,135,555 A | | 10/2000 | Liu et al. |
| 6,174,017 B1 | | 1/2001 | Salani et al. |
| 6,196,610 B1 | | 3/2001 | Pesta et al. |
| 6,375,255 B1 | * | 4/2002 | Maruta et al. ............ 296/65.09 |
| 6,520,581 B1 | * | 2/2003 | Tame ........................... 297/336 |
| 6,523,899 B1 | * | 2/2003 | Tame ........................... 297/335 |
| 6,588,822 B1 | * | 7/2003 | Duvall, Jr. ................ 296/65.16 |
| 2001/0052718 A1 | * | 12/2001 | Sugiura et al. ................ 297/15 |

FOREIGN PATENT DOCUMENTS

JP       57-104424   *  6/1982  .............. 296/65.09

* cited by examiner

Primary Examiner—Joseph D. Pape
Assistant Examiner—Hilary L Gutman
(74) Attorney, Agent, or Firm—Clark Hill PLC

(57) ABSTRACT

A seat assembly for use in an automotive vehicle comprises a seat cushion having a bottom surface extending between front and rear portions and a seat back pivotally coupled to the seat cushion for movement between an upright position and a folded flat position against the seat cushion. A spaced apart pair of risers is fixedly secured to the floor of the vehicle. A support bar extends between the risers spaced above the floor of the vehicle for pivotally supporting the seat assembly between a seating position generally parallel with the floor of the vehicle for supporting an occupant and a forwardly stowed position with the seat cushion generally upright relative to the floor of the vehicle. A pair of retractable support legs are pivotally coupled to the bottom of the seat cushion for movement between a support position extending between the seat cushion in the seating position and the floor of the vehicle and a storage position nested within a slot formed in the bottom of the seat cushion. A timing link extends between one of the pair of retractable support legs and the support beam for automatically moving the pair of retractable support legs between the support and storage positions in response to movement of the seat assembly between the seating and forwardly stowed positions.

16 Claims, 8 Drawing Sheets

SECOND ROW FOLD AND PIVOT SEAT ASSEMBLY

RELATED APPLICATION

This patent application claims priority to and all the benefits of U.S. Provisional Patent Application No. 60/322,150, filed on Sep. 13, 2001.

BACKGROUND OF THE INVENTION

1. Field of Invention

The present invention relates to a fold and pivot seat assembly for an automotive vehicle, and more particularly, to a riser assembly that allows movement of the seat assembly between a seating position and a forwardly stowed position.

2. Description of the Related Art

Automotive vehicles, especially minivans or sport utility vehicles, typically include two or three rows of seat assemblies for supporting occupants within an interior cabin and a rear cargo area adjacent and open to the interior cabin. It is known by those skilled in the art to provide a riser assembly operatively coupled between each seat assembly and the floor of the vehicle for providing movement of the seat assembly between seating and forwardly stowed or tumbled positions for extending the cargo carrying capacity of the rear cargo area into the interior cabin of the vehicle. The riser assembly typically includes front and rear legs or supports releasably latchable to striker bars fixedly secured to the vehicle floor. An example of such a riser assembly is shown in the U.S. Pat. No. 6,135,555, which issued to Liu et al. on Oct. 24, 2000. However, such risers do not allow access under the seat assembly for storage. Further, the rear legs or supports are exposed when the seat assembly is moved to the forwardly stowed position.

Therefore, it remains desirable to provide a riser that allows access under the seat assembly to increase the cargo carrying capacity of the vehicle and conceals the rear legs or supports when the seat assembly is in the forwardly stowed position.

SUMMARY OF THE INVENTION

According to one aspect of the invention, there is provided a seat assembly comprising a seat cushion for supporting an occupant seated on the seat assembly and having a bottom surface extending between front and rear portions. A seat back is operatively coupled to the seat cushion for selective pivotal movement. A first riser is fixedly secured to the floor of the vehicle and extends between the floor of the vehicle and the front portion of the bottom of the seat cushion. A second riser is fixedly secured to the floor of the vehicle spaced apart from the first riser and extends between the floor of the vehicle and the front portion of the bottom of the seat cushion. A support beam extends between the first and second risers spaced above the floor of the vehicle and is pivotally assembled to the front portion of the bottom surface of the seat cushion for pivotally supporting the seat assembly between a seating position for supporting the occupant and a forwardly stowed position with the seat cushion extending generally upright from the support beam. A pair of retractable support legs is operatively coupled to the rear portion of the bottom surface of the seat cushion for automatically pivoting between a support position extending between the seat cushion and the floor of the vehicle and a storage position against the bottom surface of the seat cushion in response to pivotal movement of the seat assembly about the support beam between the seating position and the forwardly stowed positions, respectively.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
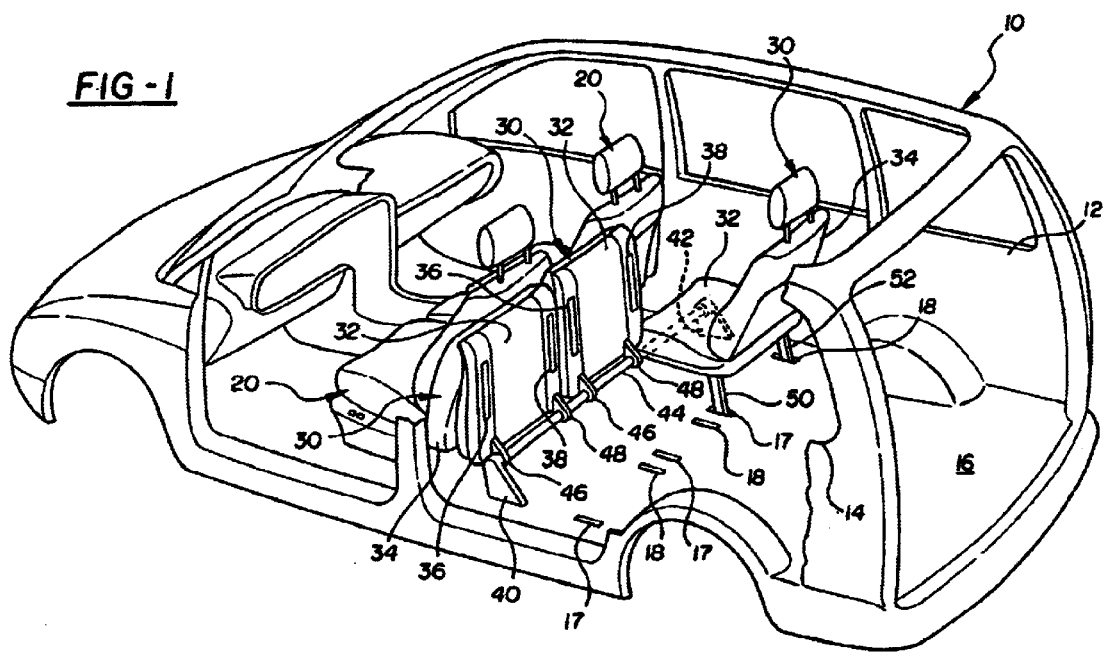
FIG. 1 is a perspective view of an automotive vehicle having rear seats incorporating an embodiment of the present invention with two of the seats in a forwardly stowed position and the remaining third seat in a seating position.

Referring to FIG. 1, an automotive vehicle 10 is shown having a generally horizontal floor 16. The floor 16 extends generally between opposing and laterally spaced apart sidewalls 12, 14. The vehicle 10 includes a first row of seats 20 and a second row of seats 30 behind the first row of seats 20 for supporting occupants above the floor 16 of the vehicle 10.

Figure 2:
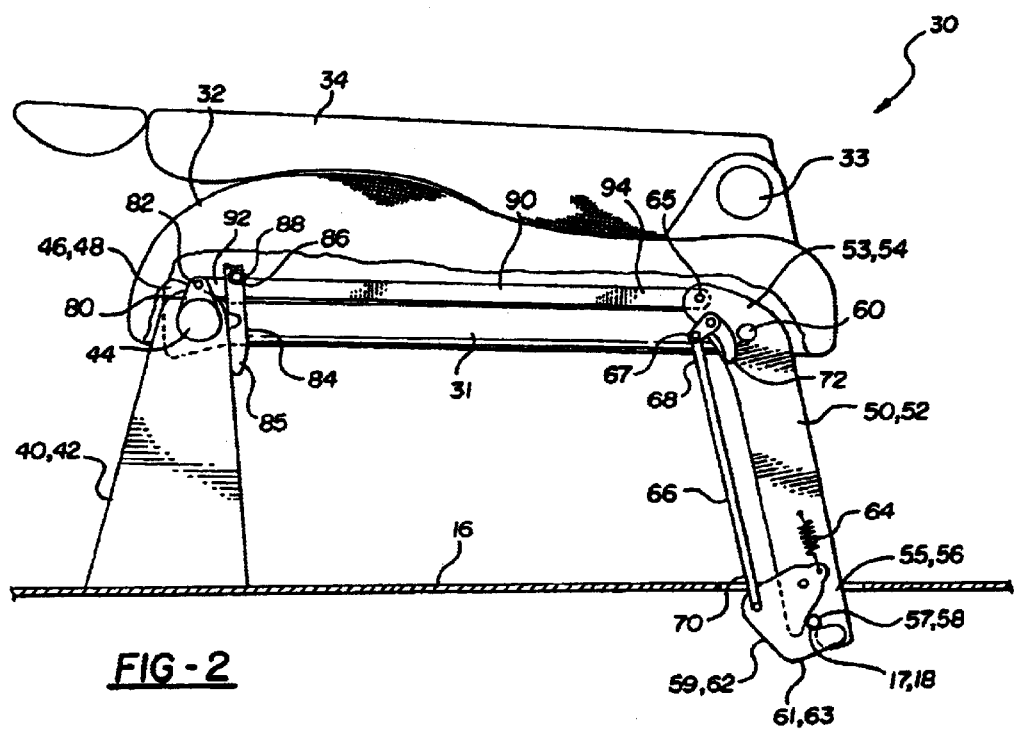
FIG. 2 is a side view of one of the rear seats.
Figure 3:
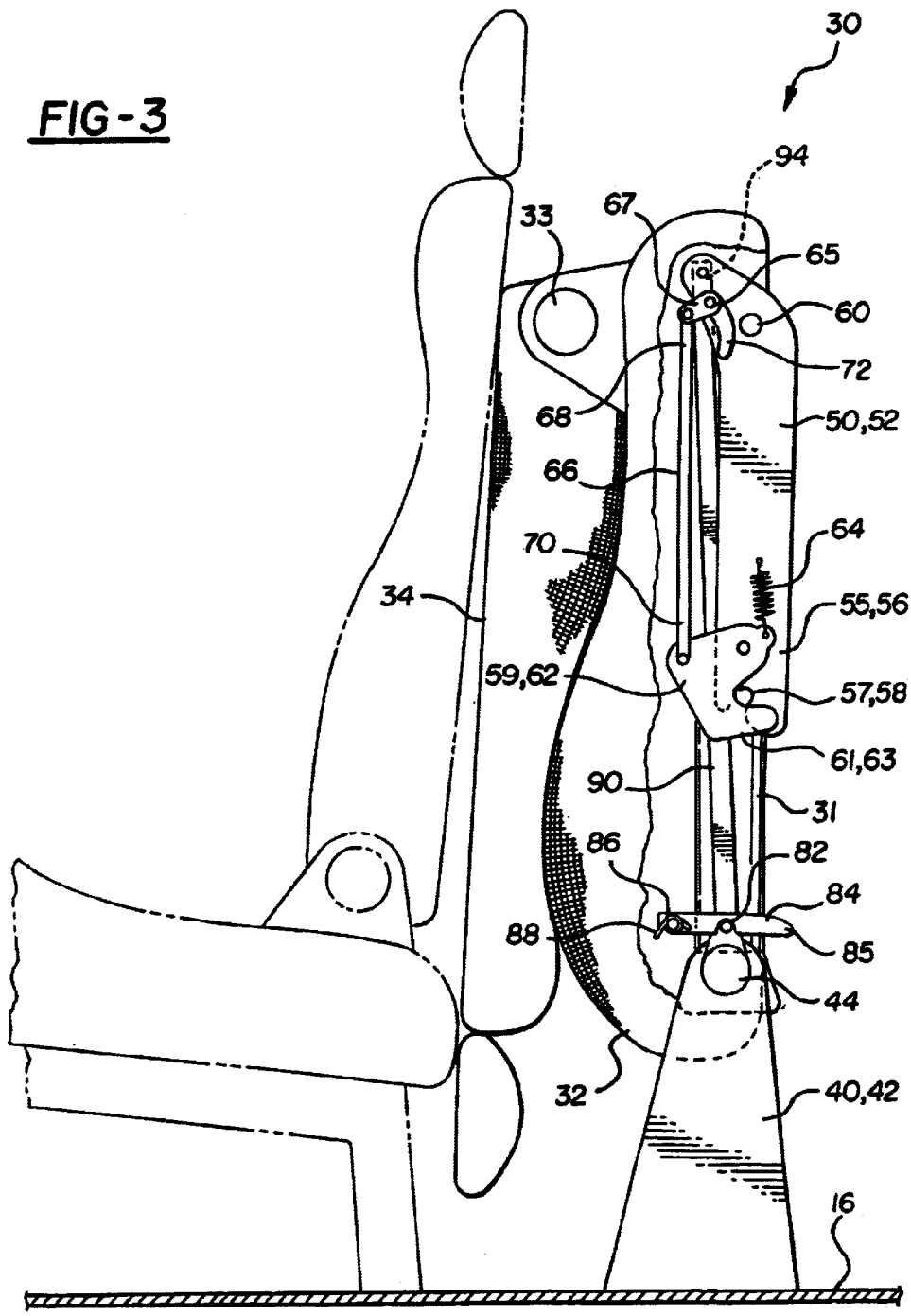
FIG. 3 is a side view of one of the rear seats in the forwardly stowed position.

Each of the seats 30 in the second row includes a seat cushion 32 and a seat back 34. Each seat back 34 is operatively coupled to the rear end of one of the respective seat cushions 32 by a recliner mechanism 33, as commonly known to those of ordinary skill in the art, for allowing pivotal adjustment of the seat back 34 relative to the seat cushion 32 between a generally upright position for supporting the back of an occupant and a folded flat position overlying the seat cushion 32 for extending the cargo carrying capacity of the vehicle 10. As best shown in FIGS. 2 and 3, the seat cushion 32 includes a rigid frame member 31 for supporting a trim-covered cellular foam pad, as commonly known to those skilled in the art. Described in greater detail below, each of the seats 30 in the second row are movable between a seating position, as shown in FIG. 1, and a forwardly stowed position, as shown in FIG. 3.

Figure 4:
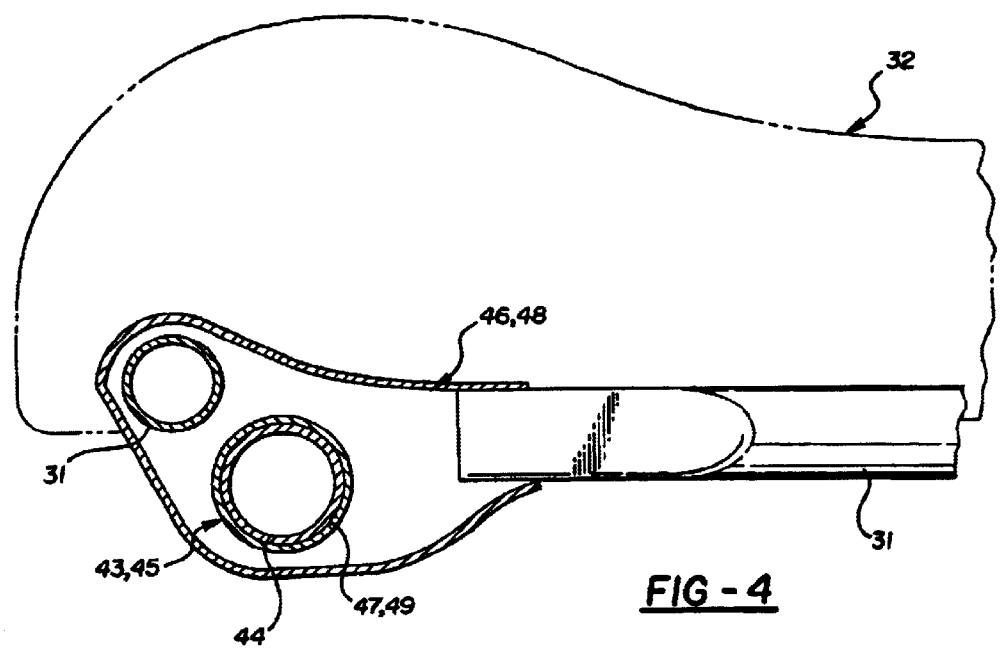
FIG. 4 is a cross-sectional view of a beam for supporting the seats above the floor of the vehicle and a bracket pivotally coupling the seats to the beam for movement between the seating and forwardly stowed positions.

A pair of risers 40, 42 are each fixedly secured to the floor 16 adjacent one of the respective sidewalls 12, 14 of the vehicle 10. The risers 40, 42 are spaced apart to provide storage under the seat 30. A cylindrical support beam 44 extends generally horizontally between the risers 40, 42 spaced above the floor 16 for supporting the front portion of each seat cushion 32. More specifically, a pair of spaced apart support brackets 46, 48 are fixedly secured to the bottom of the front portion of each frame member 31. Each support bracket 46, 48 includes a hole 43, 45 for receiving the beam 44 therethrough for pivotally coupling each seat 30 to the beam 44 for movement between the seating and forwardly stowed positions. As shown in FIG. 4, the hole 43, 45 may include a flanged bearing surface 47, 49 for providing increased stability and reduced wear between the support bracket 46, 48 and beam 44. Alternatively, a bushing, or similar, may be sandwiched between the hole 43, 45 and the beam 44 to minimize gaps and reduce wear between the support bracket 46, 48 and the beam 44.

A pair of generally parallel and spaced apart rear support legs 50, 52 extends in a support position, as shown in FIG. 2, between the seat cushion 32 and the floor 16 for supporting the rear portion of the seat cushion 32 above the floor 16. Each leg 50, 52 is pivotally coupled to the rear portion of the seat cushion 32 for pivotal movement between the support position and a storage position, as shown in FIG. 3, disposed longitudinally along the bottom of the seat cushion 32. A pair of slots 36, 38 are disposed in the bottom of each seat cushion 32 each for nestingly receiving one of the respective legs 50, 52 in the storage position. The slots 36, 38 may be formed in plastic covers that are fixed secured to the bottom of the seat cushion 32.

Referring to FIGS. 2 and 3, each seat 30 in the second row includes a folding mechanism for automatically moving the rear support legs 50, 52 between the support and storage positions in response to movement of the seat 30 between the seating and forwardly stowed positions. The folding mechanism includes a rod 60 pivotally coupled to the frame member 31. The rear support legs 50, 52 each extend between an upper end 53, 54 and an opposite lower end 55, 56. The upper end 55, 56 is fixedly secured to the rod 60 to provide movement of the rear support legs 50, 52 between the support and storage positions. The lower end 55, 56 includes a U-shaped hook portion 57, 58 for locating the rear support leg 50, 52 in the support position against a respective striker bar 17, 18 fixedly secured to the floor 16. A latch hook 59, 62 is pivotally assembled to the lower end 55, 56 of each rear support leg 50, 52 for movement between a locked position with the striker bar 17, 18 lockingly retained between the hook portion 57, 58 and the latch hook 59, 62 and an unlocked position to allow disengagement of the hook portion 57, 58 from the striker bar 17, 18. The latch hook 59, 62 includes a ramped cam surface 61, 63. The cam surface 61, 63 is engagable with the striker bar 17, 18 while locating the hook portion 57, 58 onto the striker bar 17, 18 for moving the latch hook 59, 62 out of the locked position until the hook portion 57, 58 is fully located against the striker bar 17, 18. A biasing member 64 of any suitable type, such as a helical coil spring or clock spring, extends between the each support leg 50, 52 and the respective latch hook 59, 62 for biasing the latch hook 59, 62 towards engagement with the striker bar 17, 18. A release bar 65 extends between and is pivotally assembled to the upper ends 53, 54 of the rear support legs 50, 52 for movement between unreleased and released positions. A link 66 extends between an upper end 68 pivotally coupled to an arm 67 extending radially outwardly from the release bar 65 and an opposite lower end 70 pivotally coupled to the latch hook 59, 62. The link 66 moves the latch hook 59, 62 between the locked and unlocked positions in response to movement of the release bar 65 between the unreleased and released positions, respectively. A release handle 72 extends outwardly from the release bar 65 for manual actuation of the release bar 65 between the unreleased and released positions against the force applied by the biasing member 64 upon the latch hook 59, 62.

A mounting bracket 80 is fixedly secured to the beam 44 for rigidly supporting a lock pin 82. A lock hook 84 is pivotally assembled to the frame member 31 by a pivot pin 86 for movement between a locked position lockingly engaged with the lock pin 82 and an unlocked position disengaged with the lock pin 82. While engaged with the lock pin 82, the lock hook 84 locks the seat 30 in the forwardly stowed position. A biasing member 88 of any suitable type, such as a helical coil spring or clock spring, extends between the frame member 31 and the lock hook 84 to bias the lock hook 84 towards the locked position. The lock hook 84 includes a handle portion 85 extending outwardly from the bottom of the seat cushion 32 and presented for manually releasing the lock hook 84 out of the locked position when the seat 30 is in the forwardly stowed position.

A timing link 90 extends between a front end 92 pivotally coupled to the lock pin 82 and an opposite rear end 94 pivotally coupled to the upper end 54 of one of the support legs 52. The timing link 90 automatically moves both of the rear support legs 50, 52 between the support and storage positions in response to movement of the seat 30 between the seating and forwardly stowed positions.

In operation, with the seat back 34 in the folded flat position, the seat 30 is movable from the seating position, shown in FIGS. 1 and 2, to the forwardly stowed position, shown in FIG. 3, after rotating the release handle 72 clockwise, as viewed in the figures. The latch hook 59, 62 moves clockwise out of locking engagement with the striker bar 17, 18 in response to the clockwise movement of the release handle 72. The seat 30 is then freely pivotally movable clockwise and counter clockwise, as viewed in the figures, between the seating and forwardly stowed positions about the beam 44. As the seat 30 is pivoted between the seating and forwardly stowed positions, the timing link 90 moves the rear support legs 50, 52 between the support and storage positions, respectively. As the seat 30 approaches the forwardly stowed position, the rear support legs 50, 52 are received within the respective slots 36, 38 in the bottom of the seat cushion 32. The seat 30 locks in the forwardly stowed position when the lock hook 84 lockingly engages the lock pin 82. To return the seat 30 from the forwardly stowed position to the seating position, the lock hook 84 is rotated counter clockwise about the pivot pin 86 towards the unlocked position to disengage the lock hook 84 from the lock pin 82. The seat 30 is then freely movable about the beam 44 between the forwardly stowed and seating positions. As the seat 30 is moved towards the seating position, the link 90 moves the rear support legs 50, 52 out of the respective slots 36, 38 from the storage position towards the support position. Further, as the striker bar 17, 18 contacts the cam surface 61, 63 of the latch hook 59, 62, the continued motion of the seat 30 towards the seating position causes the striker bar 17, 18 to move the latch hook 59, 62 out of the locked position. When the seat 30 reaches the seating position, the hook portion 57, 58 fully engages the striker bar 17, 18 to locate the rear support legs 50, 52 in the support position. The biasing member 64 urges the latch hook 59, 62 into the locked position to retain the striker 17, 18 between the latch hook 59, 62 and the hooked portion 57, 58.

Figure 5:
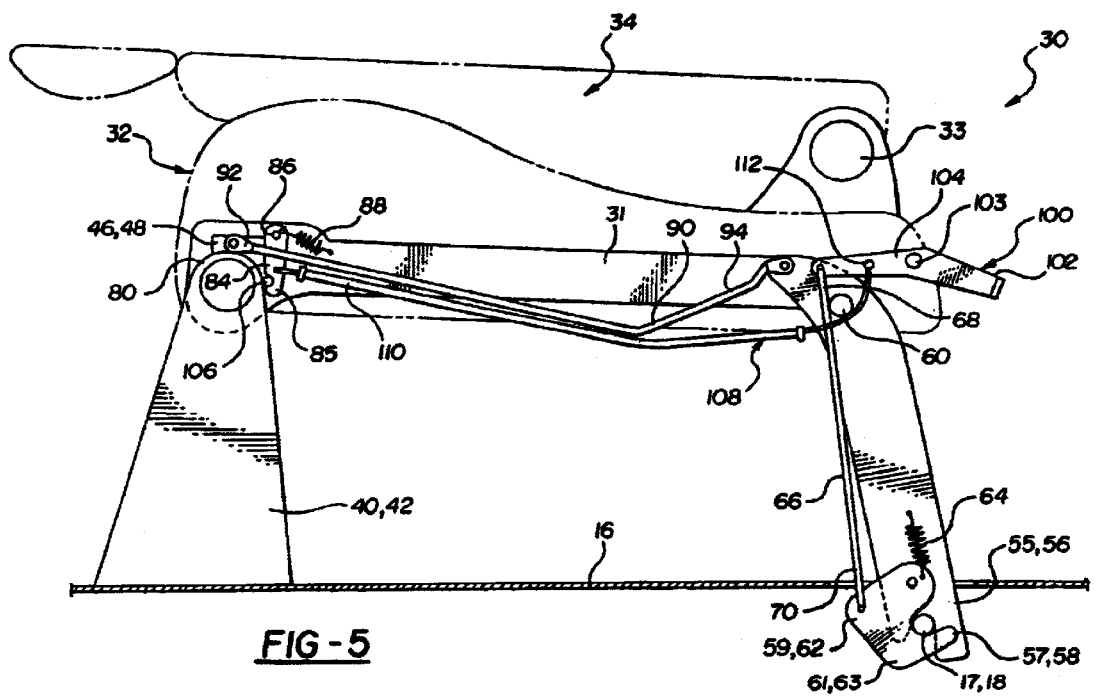
FIG. 5 is a side view of one of the rear seats according to an alternative embodiment of the invention.
Figure 6:
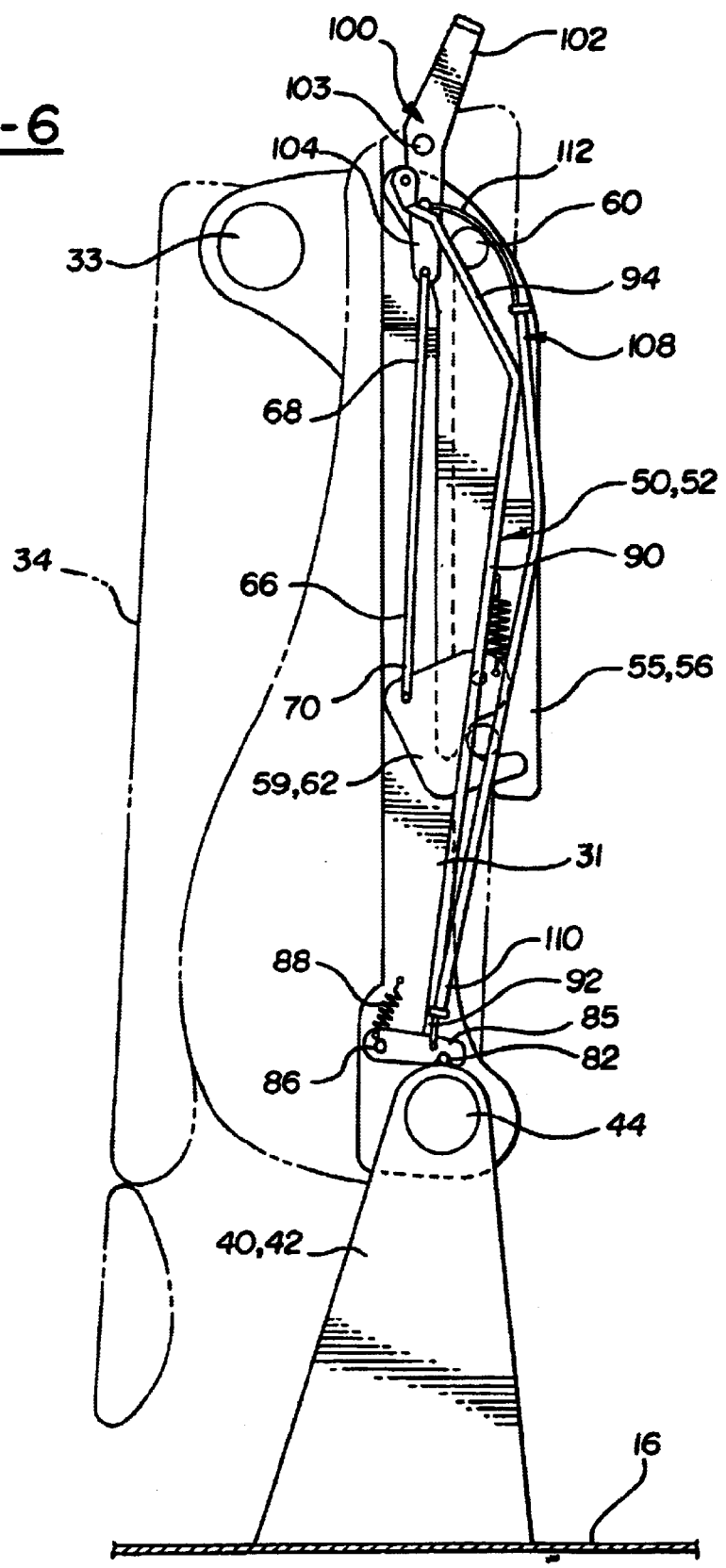
FIG. 6 is a side view of one of the rear seats in the forwardly stowed position according to an alternative embodiment of the invention.

A second embodiment of the folding mechanism is shown in FIGS. 5 and 6 with the seat 30 in the seating and forwardly stowed positions, respectively. The folding mechanism includes a release lever 100 for manually releasing the latch hook 59, 62. More specifically, the release lever 100 has a handle portion 102 extending outwardly from the seat cushion 32 and an opposite distal end 104 pivotally coupled to the upper end 68 of the link 66. The release lever 100 is pivotally coupled between the handle portion 102 and distal end 104 to the frame 31 by a pivot pin 103 for movement between unreleased and released positions. The latch hook 59, 62 is moved between the locked and unlocked positions by the link 66 when the release lever 100 is moved between the unreleased and released positions, respectively.

A second lock pin 106 is rigidly supported by the bracket 80 for lockingly engaging the lock hook 84 when the seat 30 is in the seating position. The biasing member 88 biases the lock hook 84 in a clockwise direction, as viewed in the figures, towards engagement with the second lock pin 106 when the seat 30 is in the seating position. A bowden cable 108 extends between a first end 110 fixedly secured to the handle portion 85 and an opposite second end 112 fixedly secured to the distal end 104 of the release lever 100 for moving the lock hook 84 in and out of locking engagement with the second lock pin 106 in response to movement of the release lever 100 between the unreleased and released positions. Thus, the release lever 100 moves both the lock hook 84 and the latch hooks 59, 62 together between the locked and unlocked positions when rotated between the unreleased and released positions, respectively.

Figure 7:
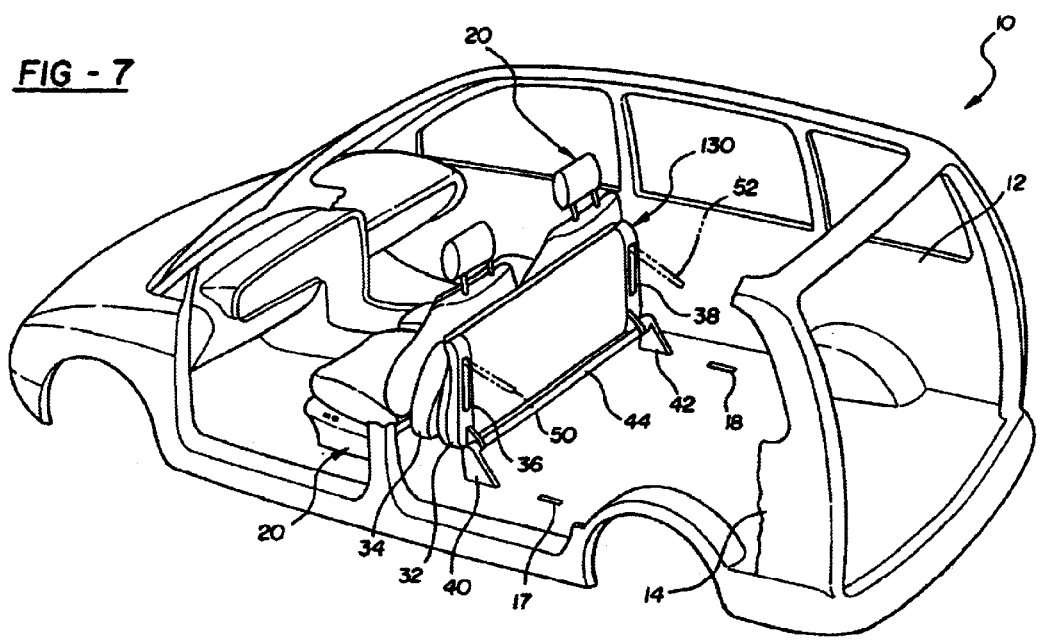
FIG. 7 is a perspective view of the automotive vehicle having a rear bench seat incorporating the invention pivoted forwardly to the forwardly stowed position.
Figure 8:
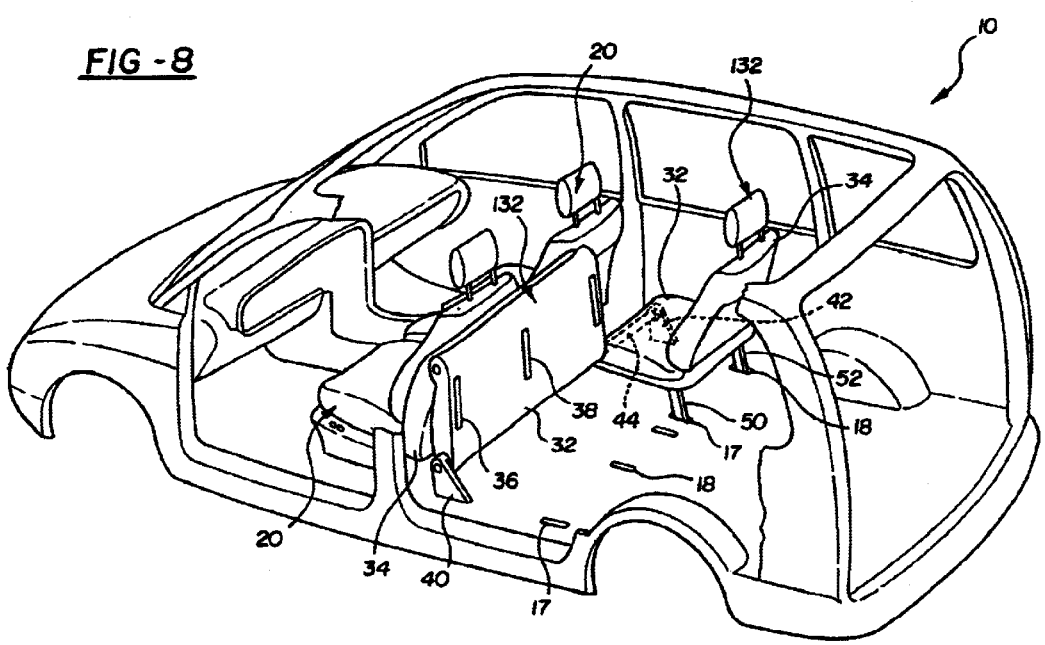
FIG. 8 is a perspective view of the automotive vehicle having a pair of rear seats with one of the seats in the folded position and the other seat is an upright seating position.

In FIG. 1, the second row of seats 30 is shown to include three evenly spaced seats of equal width. However, it should be appreciated that the risers 40, 42, support beam 44, and folding mechanism described above can support any configuration or lateral arrangement of seats, such as a full bench seat 130, as shown in FIG. 7, or a pair of seats 132 of unequal width, as shown in FIG. 8.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat assembly for use in an automotive vehicle comprising:
    a seat cushion for supporting an occupant seated on said seat assembly and having a bottom surface extending between opposite front and rear portions;
    a seat back operatively coupled to said seat cushion for selective pivotal movement;
    a first riser adapted to be fixedly secured to the floor of the vehicle and extending between the floor of the vehicle and said front portion of said bottom surface of said seat cushion;
    a second riser adapted to be fixedly secured to the floor of the vehicle spaced apart from said first riser and extending between the floor of the vehicle and said front portion of said bottom surface of said seat cushion;
    a support beam extending between said first and second risers spaced above the floor of the vehicle and pivotally assembled to said front portion of said bottom surface of said seat cushion for pivotally supporting said seat assembly between a seating position for supporting the occupant and a forwardly stowed position with said seat cushion extending generally upright from said support beam;
    a pair of retractable support legs operatively coupled to said rear portion of said bottom surface of said seat cushion for automatically pivoting between a support position extending between said seat cushion and the floor of the vehicle and a storage position against said bottom surface of said seat cushion in response to pivotal movement of said seat assembly about said support beam between said seating position and said forwardly stowed position, respectively; and
    a pair of slots formed in said bottom surface of said seat cushion each for receiving one of said support legs in said storage position.

2. A seat assembly as set forth in claim 1 including a support bracket fixedly secured to said bottom of said seat cushion and pivotally coupled to said support beam for pivotal movement and support of said seat assembly between said seating position and said forwardly stowed position.

3. A seat assembly as set forth in claim 2 including a mounting bracket fixedly secured to said support beam for rigidly supporting a lock pin.

4. A seat assembly as set forth in claim 3 including a lock hook pivotally assembled to said seat cushion for movement between a locked position lockingly engaged with said lock pin to maintain said seat assembly in said forwardly stowed position and an unlocked position to allow movement of said seat assembly between said forwardly stowed position and said seating position, said lock hook including a handle portion extending outwardly from said bottom of said seat cushion and presented for manually releasing said lock hook out of said locked position when said seat assembly is in said forwardly stowed position.

5. A seat assembly as set forth in claim 4 including a first biasing member extending between said lock hook and said mounting bracket for biasing said lock hook in said locked position.

6. A seat assembly as set forth in claim 5 wherein each of said pair of retractable support legs include an upper end pivotally coupled to said seat cushion for movement between said support position extending between said bottom surface of said seat cushion and the floor of the vehicle and said storage position received in one of said pair of slots in said bottom surface of said seat cushion.

7. A seat assembly as set forth in claim 6 including a rod pivotally coupled to said seat cushion and fixedly secured to both of said pair of retractable support legs for synchronizing pivotal movement of said pair of retractable support legs between said support position and said storage position.

8. A seat assembly as set forth in claim 7 including a timing link extending between a front end pivotally coupled to said locking pin and an opposite rear end pivotally coupled to said upper end of one of said pair of retractable support legs for automatically moving said pair of retractable support legs between said support and storage positions in response to pivotal movement of said seat assembly between said seating and forwardly stowed positions, respectively.

9. A seat assembly as set forth in claim 8 wherein each of said pair of retractable support legs include a lower end having a hook portion for locating said retractable support legs in said support position against a respective striker bar fixedly secured to the floor of the vehicle.

10. A seat assembly as set forth in claim 9 including a latch hook pivotally assembled to said lower end of each of said pair of retractable support legs for pivotal movement between a locked position with the striker bar lockingly held between said latch hook and said hook portion of said support leg and an unlocked position disengaged with the striker bar to allow movement of said seat assembly between said seating and forwardly stowed positions.

11. A seat assembly as set forth in claim 10 including a second biasing member for biasing said latch hook in said locked position.

12. A seat assembly as set forth in claim 11 including a release bar pivotally coupled to said pair of retractable support legs for movement between unreleased and released positions and operatively coupled to said latch hook for manually moving said latch hook between said locked and unlocked positions in response to pivotal movement of said release bar between said unreleased and released positions, respectively.

13. A seat assembly as set forth in claim 13 including a link extending between an upper end pivotally coupled to said release bar and a lower end pivotally coupled to said latch hook for moving said latch hook between said locked and unlocked positions in response to pivotal movement of said release bar between said unreleased and released positions, respectively.

14. A seat assembly as set forth in claim 13 including a release lever extending outwardly from said release bar for facilitating movement of said release bar between said unreleased and released positions.

15. A seat assembly as set forth in claim 14 including a recliner mechanism operatively coupled between said seat back and said seat cushion for selective pivotal adjustment of said seat back between an upright seating position and a forwardly folded flat position overlying the seat cushion.

16. A seat assembly as set forth in claim 15 wherein said seat assembly is movable between said seating position and said forwardly stowed position when said seat back is in said forwardly folded flat position.

* * * * *